United States Patent
Gatsios et al.

(10) Patent No.: US 12,504,141 B2
(45) Date of Patent: Dec. 23, 2025

(54) LIGHTING DEVICE FOR A MOTOR VEHICLE, IN PARTICULAR A HIGH-DEFINITION HEADLAMP

(71) Applicant: Hella GmbH & Co. KGaA, Lippstadt (DE)

(72) Inventors: Sebastian Gatsios, Arnsberg (DE); Florian Herold, Bielefeld (DE); Dirk Kliebisch, Paderborn (DE); Ingo Möllers, Rietberg (DE); Alexander Schwan, Kamen (DE); Patrick Vogel, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/745,966

(22) Filed: Jun. 17, 2024

(65) Prior Publication Data
US 2024/0426449 A1    Dec. 26, 2024

(30) Foreign Application Priority Data
Jun. 20, 2023 (DE) .......................... 102023116034.6

(51) Int. Cl.
*F21S 41/63* (2018.01)
*F21S 41/27* (2018.01)
*F21S 41/657* (2018.01)

(52) U.S. Cl.
CPC ............. *F21S 41/657* (2018.01); *F21S 41/27* (2018.01); *F21S 41/635* (2018.01)

(58) Field of Classification Search
CPC ......... F21S 41/635; F21S 41/143; F21S 41/25
See application file for complete search history.

(56) References Cited

U.S. PATENT DOCUMENTS

2016/0347237 A1* 12/2016 Bhakta ................. F21S 41/255
2022/0128209 A1*  4/2022 Fischer ................ F21S 41/153

FOREIGN PATENT DOCUMENTS

DE    102020114767 A1   12/2021
WO      2020094376 A1    5/2020

* cited by examiner

*Primary Examiner* — Elmito Breval
(74) *Attorney, Agent, or Firm* — Husch Blackwell LLP

(57) ABSTRACT

A lighting device for a motor vehicle, in particular a high-definition headlamp, includes an imaging component that has an active surface on which light-emitting diodes or laser diodes are arranged in a matrix to generate pixels in a light distribution in a targeted manner, and a projection lens with which the light emitted from the active surface is projected outward from the motor vehicle when the lighting device is in operation. The lighting device is designed to switch the projection lens from a first setting to a second and from the second setting to the first. The projection lens has a first focal length in the first setting, and a second focal length in the second setting, which is greater than the first focal length.

17 Claims, 2 Drawing Sheets

LIGHTING DEVICE FOR A MOTOR VEHICLE, IN PARTICULAR A HIGH-DEFINITION HEADLAMP

CROSS REFERENCE

This application claims priority to German Application No. 10 2023 116034.6, filed Jun. 20, 2023, the entirety which is hereby incorporated by reference.

FIELD OF THE INVENTION

The present invention relates to a lighting device for a motor vehicle, in particular a high-definition headlamp.

BACKGROUND OF THE INVENTION

DE 10 2020 100 762 A1 discloses a lighting device of this type. The headlamp described therein comprises a first module and a second module. Each module contains a solid-state LED array forming an imaging component with an active surface on which the light-emitting diodes or laser diodes are arranged in a matrix with which pixels are generated in a light distribution in a targeted manner. Each module also has a projection lens with which the light emitted from the active surface is projected outward from the motor vehicle. The light distribution generated by the first module has a higher resolution than that generated by the second module. Both modules can be used, however, to generate a high beam and a symbol projected onto the road surface. Nevertheless, only the first module generates a high-definition symbol.

BRIEF SUMMARY OF THE INVENTION

The problem addressed by the present invention is to create a lighting device of the above type, with which different light distributions with different resolutions can be generated with a simple design and/or more cost-effectively.

The lighting device is designed to switch the projection lens from a first setting to a second setting, and from the second setting to the first setting, wherein the projection lens has a first focal length in the first setting and a second focal length in the second setting, which is greater than the first focal length. The pixel density depends on the focal length of the projection lens. This means that there is no need for the two different modules used in the prior art to obtain different resolutions, thus resulting in a simpler and/or less expensive lighting device.

The imaging component can be a solid-state LED array, in particular an SSL-HD module.

The lighting device can have an adjuster for moving the projection lens from the first setting to the second, and from the second setting to the first. The adjuster makes it possible to select the setting that is ideal for the desired application.

By way of example, the adjuster can contain an electromagnet and at least one spring. When the electromagnets are activated, the projection lens can be switched from the first setting to the second, and then stay in the second setting until the electromagnet is switched off. When the power is switched off, the at least one spring returns the projection lens to the first setting.

The adjuster could also contain a motor, in particular a stepper motor.

The projection lens can be or comprise a lens assembly.

The lighting device can be designed to switch the projection lens from the first setting to the second and from the second setting to the first by moving the lens assembly in relation to the active surface of the imaging component.

The projection lens and/or lens assembly can contain numerous lenses, in particular at least three lenses, preferably at least four lenses, through which the light emitted from the active surface of the imaging component passes successively. This lighting device can be designed such that at least two of the lenses can be moved in relation to one another in order to switch the projection lens from the first setting to the second and from the second setting to the first.

The lighting device can be designed to switch back and forth between different fields of view by switching the projection lens from the first setting to the second and from the second setting to the first. The first field of view can have a first image angle, and the second field of view can have a second image angle, which is smaller than the first image angle.

The first field of view can be for a light distribution, and the second can be for a video projection in front of the motor vehicle. By way of example, a large field of view with a low pixel density can be obtained while the vehicle is moving, and a small field of view with a high pixel density can be obtained in a video projection while the vehicle is stationary.

Alternatively, the first field of view can be used for a first mode of the high beam light distribution, and the second field of view can be used for a second mode of the high beam light distribution that differs from the first. By way of example, one of the two high beam modes can be ideal for when there are no obstructions in front of the vehicle, and thus be brighter as a result of it being more focused.

When the lighting device is switched off, the project lens can be switched to the second setting. Consequently, when the sun is low over the horizon, the solid-state LED array will not be damaged by sunlight passing through the lens.

On the whole, the value of the lighting device itself is increased by being able to change the focal length of the projection lens.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
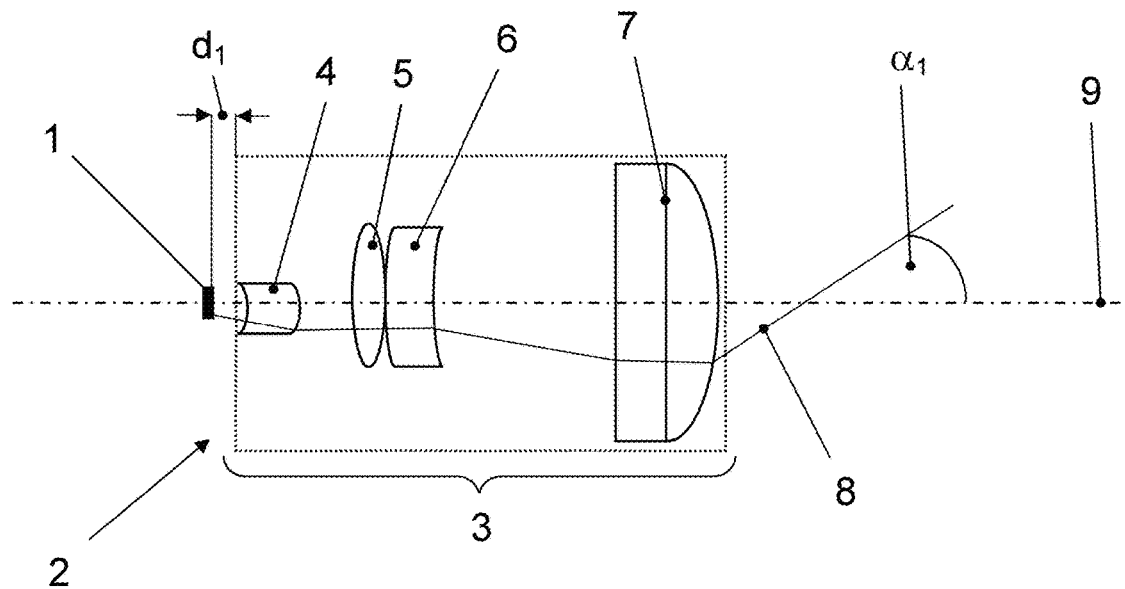
FIG. 1 shows a schematic side view of a first exemplary embodiment of the lighting device according to the invention, with an exemplary light beam, in which the projection lens is in a first setting.

The same reference symbols are used for identical and functionally identical components in the drawings.

Figure 2:
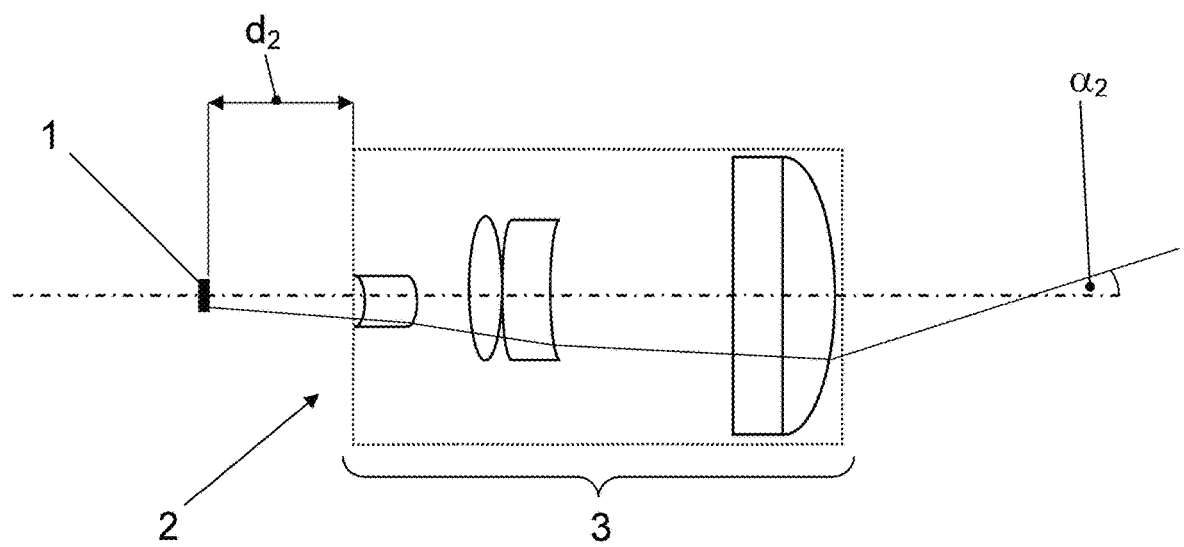
FIG. 2 shows a schematic side view of the first exemplary embodiment with the projection lens in a second setting.

The first exemplary embodiment of the lighting device shown in FIGS. 1 and 2 comprises an imaging component 1 that has an active surface on which light-emitting diodes or laser diodes are arranged in a matrix to generate the pixels in a light distribution in a targeted manner. The imaging component 1 is a solid-state LED array, in particular an SSL-HD module.

The lighting device also contains a projection lens 2 in the form of a lens assembly 3. In addition to the lens assembly 3, the projection lens 2 can also contain one or more optical components.

The lens assembly 3 in the exemplary embodiments shown in the drawings contains four lenses 4, 5, 6, 7, through which the light 8 emitted from the imaging component 1 passes successively. The optical axis 9 of the lens assembly is also indicated in the drawings. The lens assembly 3 can also contain more or less than four lenses. In particular, the lens assembly 3 contains four to seven lenses.

In the first setting of the projection lens 2 shown in FIG. 1, the lens assembly 3 is at a first distance $d_1$ to the imaging component 1. In this setting, a portion of the light 8 exits the lens assembly 3 at a first image angle $d_1$ to the optical axis 9. The first image angle $\alpha_1$ corresponds to an image angle for headlamp functions in which the pixels are relatively large and the pixel density is relatively low.

The lighting device also contains an adjuster, not shown, with which the projection lens 2 can be switched from the first setting to the second, and from the second setting to the first. The adjuster can move the lens assembly 3 in relation to the active surface of the imaging component 1 to adjust the focal length of the projection lens 2, to switch the projection lens 2 from the first setting to the second, and from the second setting to the first. The adjuster can therefore change the distance between the lens assembly 3 and the imaging component 1.

The adjuster can contain an electromagnet and at least one spring. When the electromagnet is activated, the projection lens can be switched from the first setting to the second, where it remains in the second setting until the electromagnet is switched off. When the power is switched off, the at least one spring returns the projection lens to the first setting.

The adjuster could also be a stepper motor.

In the second setting of the projection lens 2 shown in FIG. 2, the lens assembly 3 is at a second distance $d_2$ to the imaging component 1. The second distance $d_2$ is greater than the first distance $d_1$. In the second setting, a portion of the light 8 exits the lens assembly 3 at a second image angle $\alpha_2$ to the optical axis 9. The second image angle $\alpha_2$ is smaller than the first image angle $\alpha_1$. The second image angle $\alpha_2$ corresponds to an image angle for video projection in which the pixels are relatively small, and the pixel density is relatively high.

Figure 3:
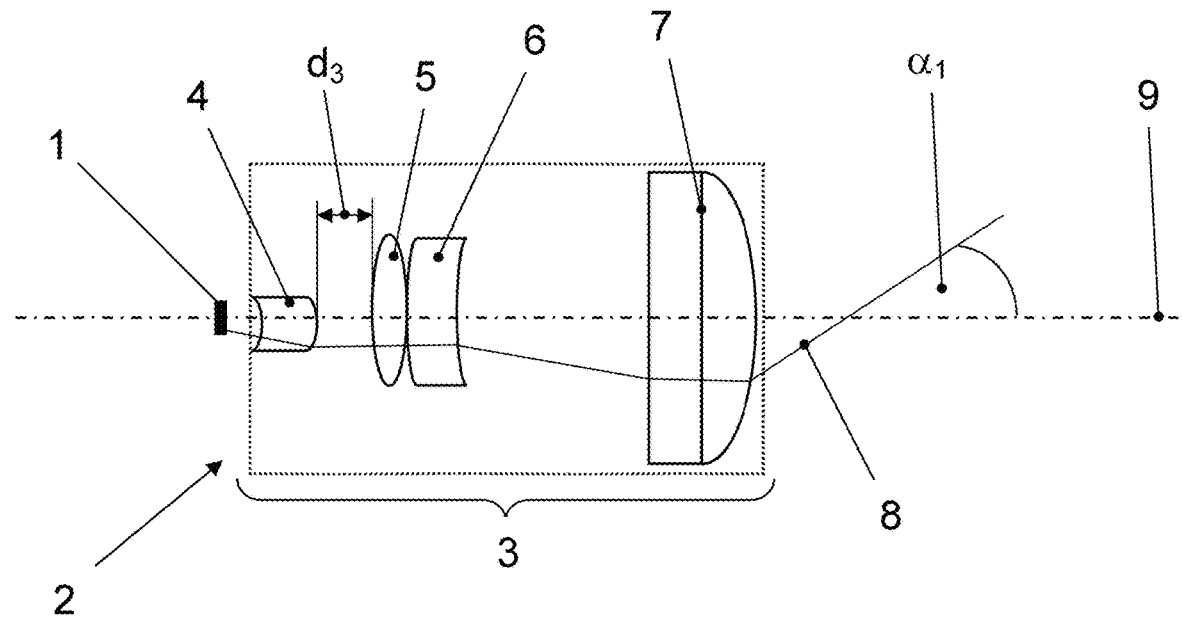
FIG. 3 shows a schematic side view of a second exemplary embodiment of the lighting device according to the invention, with an exemplary light beam, in which the projection lens is in a first setting.
Figure 4:
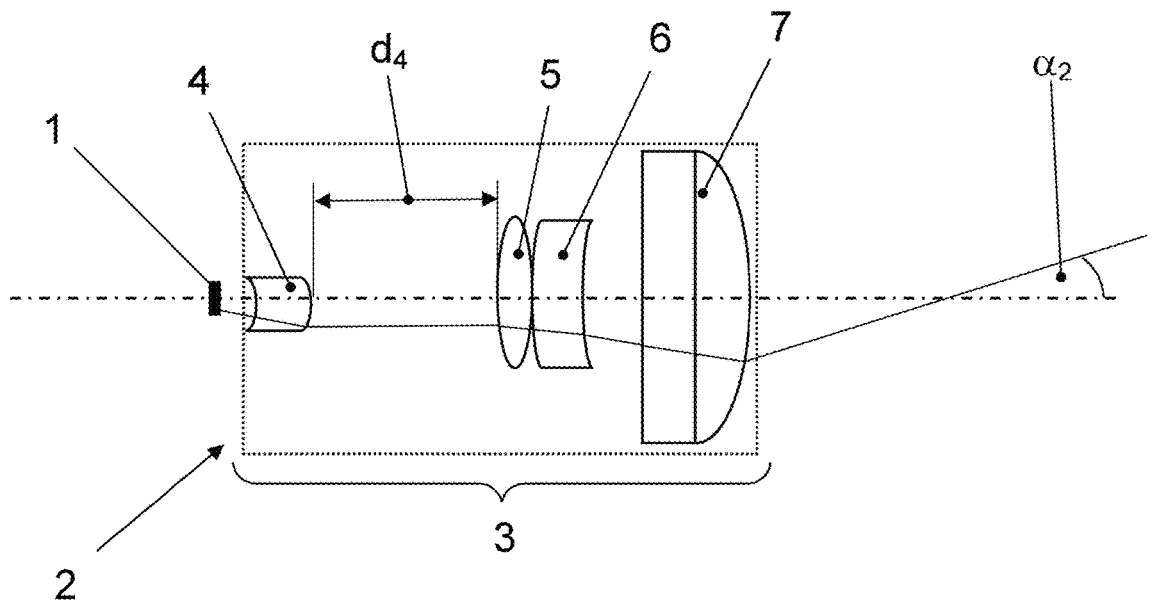
FIG. 4 shows a schematic side view of the second exemplary embodiment with the projection lens in a second setting.

The second exemplary embodiment of the lighting device shown in FIGS. 3 and 4 substantially contains the same components as the first exemplary embodiment. The adjuster in the second exemplary embodiment, however, is not configured to move the lens assembly 3 in relation to the active surface of the imaging component 1, but instead moves individual lenses or groups of lenses in the lens assembly 3 in relation to other lenses or groups of lenses, to adjust the focal length of the projection lens 2. The adjuster in the second exemplary embodiment can also contain an electromagnet and at least one spring, or it can be a stepper motor.

In the first setting of the projection lens 2 shown in FIG. 3, the distance $d_3$ between the first lens 4, at the entry side of the lens assembly 3, and the second and third lenses 5, 6 in the lens assembly 3, is relatively short. In the first setting, a portion of the light 8 exits the lens assembly 3 at a first image angle $\alpha_1$ to the optical axis 9. The first image angle $\alpha_1$ corresponds to an image angle for headlamp functions in which the pixels are relatively large and the pixel density is relatively low.

In the second setting of the projection lens 2 shown in FIG. 4, the distance $d_4$ between the first lens 4, at the entry side of the lens assembly 3, and the second and third lenses 5, 6 in the lens assembly 3, is relatively long, in particular longer than the distance $d_3$ in the first setting of the projection lens 2. Switching the lens assembly 3 from the first setting to the second is obtained by moving the second and third lenses 5, 6 in the lens assembly 3 from left to right in FIGS. 3 and 4. The first lens 4 and the fourth lens 7 remain stationary.

In the second setting of the second exemplary embodiment, a portion of the light 8 also exits the lens assembly 3 at a second image angle $\alpha z$ to the optical axis 9. The second image angle $\alpha z$ is smaller than the first image angle $d_1$. The second image angle $\alpha z$ corresponds to an image angle for video projection in which the pixels are relatively small, and the pixel density is relatively high.

Instead of moving the second and third lenses 5, 6 in the lens assembly 3, it is also possible to move another lens or group of lenses in the lens assembly 3 to alter the focal length of the lens assembly 3, or the focal length of the projection lens 2.

There can be end stops for the movement of the lens assembly as a whole or for the movement of individual lenses or lens groups in both the first exemplary embodiment and the second exemplary embodiment.

LIST OF REFERENCE SYMBOLS

1 imaging component
2 projection lens
3 lens assembly
4 first lens in the lens assembly
5 second lens in the lens assembly
6 third lens in the lens assembly
7 fourth lens in the lens assembly
8 light emitted from the imaging component
9 optical axis of the lens assembly
$\alpha_1$ first image angle
$\alpha_2$ second image angle
$d_1$ first distance from the lens assembly to the imaging component
$d_2$ second distance from the lens assembly to the imaging component
$d_3$ distance between the first and second lenses in the lens assembly in the first setting of the projection lens
$d_4$ distance between the first and second lenses in the lens assembly in the second setting of the projection lens

The invention claimed is:

1. A lighting device for a motor vehicle, the lighting device comprising:
   an imaging component that has an active surface on which light-emitting diodes or laser diodes are arranged in a matrix to generate pixels in a light distribution in a targeted manner; and
   a projection lens defining an optical axis, wherein light emitted from the active surface passes through the projection lens in a direction of the optical axis and the light emitted from the active surface is projected outward from the motor vehicle via the projection lens when the lighting device is in operation,
   wherein the projection lens switches from a first setting to a second setting and from the second setting to the first setting, wherein the projection lens moves in the direction of the optical axis relative to the imaging component when switching between the first setting and the second setting, and wherein the projection lens has a first focal length in the first setting, and a second focal length in the second setting, wherein the second focal length is greater than the first focal length.

2. The lighting device according to claim 1, wherein the imaging component is a solid-state LED array.

3. The lighting device according to claim 2, wherein the imaging component is an SSL-HD module.

4. The lighting device according to claim 1, further including an adjuster to move the projection lens in the direction of the optical axis and switch the projection lens from the first setting to the second setting and from the second setting to the first setting.

5. The lighting device according to claim 4, wherein the adjuster includes an electromagnet and at least one spring.

6. The lighting device according to claim 4, wherein the adjuster includes a motor.

7. The lighting device according to claim 6, wherein the adjuster includes a stepper motor.

8. The lighting device according to claim 1, wherein the projection lens includes a lens assembly.

9. The lighting device according to claim 8, wherein the projection lens switches from the first setting to the second setting and from the second setting to the first setting via movement of the lens assembly in relation to the active surface on the imaging component in the direction of the optical axis.

10. The lighting device according to claim 8, wherein the projection lens and/or the lens assembly includes numerous lenses through which the light emitted from the active surface of the imaging component passes successively in the direction of the optical axis when the lighting device is in operation.

11. The lighting device according to claim 10, wherein at least two lenses in the projection lens and/or the lens assembly move in relation to one another in the direction of the optical axis to switch the projection lens from the first setting to the second setting and from the second setting to the first setting.

12. The lighting device according to claim 10, wherein the numerous lenses includes at least three lenses.

13. The lighting device according to claim 1, wherein the lighting device switches back and forth between different fields of view via movement of the projection lens in the direction of the optical axis from the first setting to the second setting, and from the second setting to the first setting.

14. The lighting device according to claim 13, wherein a first field of view has a first image angle ($\alpha_1$), and a second field of view has a second image angle ($\alpha_2$), wherein the second image angle ($\alpha_2$) is smaller than the first image angle ($\alpha_1$).

15. The lighting device according to claim 14, wherein the first field of view relates to a headlamp light distribution, and the second field of view relates to a video projection in front of the motor vehicle.

16. The lighting device according to claim 14, wherein the first field of view relates to a first high beam light distribution mode and the second field of view relates to a second high beam light distribution mode that differs from the first high beam light distribution mode.

17. The lighting device according to claim 14, wherein the projection lens switches to the second setting when the lighting device is shut off.

* * * * *